United States Patent
Beyerlein et al.

(10) Patent No.: US 7,484,528 B2
(45) Date of Patent: Feb. 3, 2009

(54) VALVE

(75) Inventors: Wolfgang Beyerlein, Mitteleschenbach (DE); Markus Köpfer, Mönchsroth (DE)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 477 days.

(21) Appl. No.: 11/313,259

(22) Filed: Dec. 20, 2005

(65) Prior Publication Data
US 2007/0023089 A1 Feb. 1, 2007

(30) Foreign Application Priority Data
Dec. 23, 2004 (DE) .................. 10 2004 063 273

(51) Int. Cl.
*F16K 31/06* (2006.01)

(52) U.S. Cl. ............... 137/596.17; 137/596; 137/625.2; 251/11

(58) Field of Classification Search ......... 137/596, 137/625.2, 596.17; 251/11
See application file for complete search history.

(56) References Cited

U.S. PATENT DOCUMENTS

| | | | |
|---|---|---|---|
| 3,465,962 A | | 9/1969 | Matulich et al. |
| 4,068,820 A | | 1/1978 | Pimentel |
| 4,522,219 A | * | 6/1985 | Ohkata ................. 137/62 |
| 4,551,975 A | * | 11/1985 | Yamamoto et al. ........... 60/528 |
| 4,750,520 A | | 6/1988 | Heim et al. |
| 4,806,815 A | * | 2/1989 | Honma ................. 310/307 |
| 5,345,963 A | | 9/1994 | Dietiker |
| 5,388,984 A | * | 2/1995 | Meslif ................. 251/129.05 |
| 6,247,493 B1 | * | 6/2001 | Henderson ............ 251/129.05 |
| 6,691,977 B2 | * | 2/2004 | Knebel et al. ............ 251/11 |
| 6,742,542 B1 | | 6/2004 | Dierks |
| 6,840,257 B2 | * | 1/2005 | Dario et al. ............ 251/11 |
| 6,843,465 B1 | | 1/2005 | Scott |
| 6,972,659 B2 | | 12/2005 | von Behrens et al. |
| 6,981,374 B2 | | 1/2006 | von Behrens et al. |

(Continued)

FOREIGN PATENT DOCUMENTS

DE 10257549 8/2004

(Continued)

OTHER PUBLICATIONS

English Abstract of JP 61103081, published May 21, 1986.

(Continued)

*Primary Examiner*—Stephen M Hepperle
*Assistant Examiner*—Craig Price
(74) *Attorney, Agent, or Firm*—Dority & Manning, P.A.

(57) ABSTRACT

A valve is provided with a valve housing encompassing a pressure chamber and possessing at least two valve ports which open into the pressure chamber, whereby, in the pressure chamber at least one axially slidable valve stem exists, which controls at least one of the valve ports and which the at least one valve stem is movable between a closed position and an open position. The valve further encompasses at least one wire or band shaped SMA element, the element having an SMA, as well as possessing a resetting element for the movement of the valve stems into the closure direction. The valve seat carries on its first end a port closing closure disk, whereby its second end is axially guided within the pressure chamber on a base plate which the plate extends itself transversely to the valve stems.

17 Claims, 5 Drawing Sheets

U.S. PATENT DOCUMENTS

| | | |
|---|---|---|
| 7,017,345 B2 | 3/2006 | von Behrens et al. |
| 7,082,890 B2 | 8/2006 | MacGregor et al. |
| 7,093,817 B2 | 8/2006 | MacGregor et al. |
| 7,117,673 B2 | 10/2006 | Szilagyi |
| 7,318,576 B2 | 1/2008 | Bauerle et al. |
| 7,350,762 B2 | 4/2008 | MacGregor et al. |
| 2005/0001182 A1* | 1/2005 | Wise et al. .................... 251/11 |
| 2005/0023086 A1 | 2/2005 | Szilagyi |
| 2005/0121636 A1 | 6/2005 | Scott |
| 2005/0184533 A1 | 8/2005 | Hebenstreit et al. |
| 2006/0048511 A1 | 3/2006 | Everson et al. |
| 2007/0277877 A1 | 12/2007 | Ghorbal et al. |

FOREIGN PATENT DOCUMENTS

| | | |
|---|---|---|
| JP | 61103081 | 5/1986 |
| JP | 07027252 | 1/1995 |
| WO | WO 01/59344 | 8/2001 |

OTHER PUBLICATIONS

English Abstract of JP 07027252, published Jan. 27, 1995.
French Search Report, Application No. 0513213, dated Mar. 9, 2007.
Behrens et al., U.S. Appl. No. 11/101,849, filed Apr. 8, 2005, "Methods of Manufacturing Highly Integrated SMA Actuators".
Garsha et al., U.S. Appl. No. 11/503,392, filed Aug. 11, 2005, "Turn-Actuator with Tensile Element of Shape Memory Alloy".
Andrei Szilagyi, U.S. Appl. No. 11/719,110, filed May 11, 2007, "Shape-Memory Alloy Actuator and Latches Including Same".

* cited by examiner

VALVE

BRIEF SUMMARY OF THE INVENTION

The invention concerns a valve, for example, a pneumatically applied 2/2 or 3/3-way valve, which possesses a valve housing encompassing a pressure chamber, whereby at least three valve ports have access to the pressure chamber. The activation of a valve, so described, can be accomplished with the aid of a Shape Memory Alloy (hereinafter, designated "SMA"). An SMA metal concerns alloys, which, dependent upon their temperature, present themselves in two different structural conditions. With an SMA, at room temperature, a metal with martensitic properties is present, which metal, with a cubic, surface centralized lattice pattern, at a particular threshold temperature, approximately 80° C., changes itself into an austenitic structure. A wire of an SMA shortens itself by means of this change into the austenitic condition, whereby work is performed and, for example, a valve element can be activated to move counter to the force of a retraction means. SMA metals are predominately alloys with bases of iron, copper, and nickel-titanium, whereby, this given succession of alloy designations also represents an increase in the relative shape memory characteristic of the alloy. On this account, in actuators and valves, mainly NiTi-alloys are chosen.

It is the purpose of the invention, to so design a valve, activated with the aid of SMA elements, that the activation force engendered by the SMA element is effectively made use of, whereby, simultaneously, a simple assembly and an exact control of valve operation is enabled.

This purpose is achieved by means of a valve in accord with an aspect of the invention. In the case of such a valve, there are to be found in the pressure space encompassed by a valve housing the following features:
  a) at least one port controlling valve stem, axially movable between an open and closed position, and which has a first and a second end,
  b) at least one SMA element, of band or wire design, for the purpose of activating the valve stem into an opening movement, and
  c) a retraction means serving for the moving of the valve stem into a closed position.

The valve stem carries on its first end a closure disk for shutting off a valve opening, whereby the second end is axially guided on a base plate in the pressure chamber which extends itself transversely to the valve stem. At least one SMA element, at its ends, is connected to the ground plate and carries the valve stem in its centrally located section, whereby the legs of the SMA element, which extend away from the valve stem, encloses an angle which opens itself toward the base plate. The size of this angle is optional and may lie between 0° and 180°. Beyond this, between the valve openings and the SMA element a shielding wall is present, in which an opening penetrated by at least one of the first ends of the valve stem can be found.

Because the valve stem, in common with the SMA element which activates it, is placed within the valve pressure chamber, the activation force for the stem is lessened. As mentioned above, the ports of the valve open into the pressure chamber, so that at this location, in comparison to the atmosphere, an over or under pressure builds up, in accord with the current task. If the SMA element were outside the pressure chamber, thus in a region of the valve, which is under atmospheric pressure, then the valve stem would be obliged to pass through the wall by means of a pressure tight bushing, so that its first end, which carries a closure disk, could impact a valve seat in the pressure chamber. Such a pressure tight penetration by the valve stem requires an increased activation force for the valve stem because of increased friction and also because of a pressure difference between the pressure chamber and the atmosphere. In the case of an invented arrangement, both the SMA element as well as the valve stem are to be found within the pressure chamber, and hence this above disadvantage is avoided. An SMA element for the activation of the valve stem can, under these circumstances, be designed as a weaker element. This is a positive situation for sensitive valve control.

A fluid, which is not obstructed by the SMA element and which flows during the operation of the valve through the pressure chamber, creates a cooling effect, which disturbs a heating system provided for a shortening of the SMA element. A reproducible control of a set-position of the valve stem in such a case would not be possible, or possible only at the expense of a major technological effort to establish control.

A further advantage of the invented valve can be found due to the angular arrangement of the SMA element in which a mechanical advantage can be gained, which is especially valuable where a load tallying operation is in operation.

In the case of one favored embodiment, provision has been made that the shield wall essentially covers the entire projected area of the pressure chamber. Doing this assures that a direct fluid flow against the SMA is assuredly prevented.

In addition to the above advantage, a shield wall, constructed in the described way, also offers a mechanical protective means, especially during the assembly of the valve, as will be explained below. A further advantageous embodiment provides that the shield wall and the base plate are to be connected together in a central location. As mentioned above, at least one valve stem is guided by the base plate. This feature can be carried out in a very simple manner in the present embodiment in that an opening exists in the plate, which is to be penetrated by the second end of the valve stem. One such opening could weaken the structural stability of the base plate. The mentioned fixation of the shield wall onto the base plate acts against such a weakening. Advantageously, the shield wall is not only in a central zone, but is also affixed proximal to the ends of the SMA elements on the base plate. Thus, in the resulting double layer of the shield wall and the base plate, a stable component has been created, which offers mechanical protection for the SMA element and moreover assures that a prior prestressing of and the geometry of an SMA element are not subject to further change.

In the case of yet another advantageous embodiment, the shield wall and a wall of the valve housing, which have a valve port therein, are respectively formed by the joining of two partial sections, which close an angle between them, which corresponds to the angle created by the legs of the SMA element. Thereby, assurance is provided, that that the shield wall finds separated at a continually uniform distance over its length away from the SMA element and thereby its protection function remains in force. Moreover, there arises from the stated embodiments a compact method of construction which is also saving of material and space.

The guidance of the valve stem is carried out, as has already been indicated above, in such a manner, that the second end of the stem penetrates an opening in the base plate. The second end of the valve stem is thus, as is also the first end, supported in an axially movable manner in an easily accomplished way. The retraction of the valve guide after an activation by the SMA element is done, preferably, by a helical compression spring which circumferentially encompasses the valve stem.

A simplified method for the fixation of the SMA element on the valve stem provides that the valve stem possesses two separate, longitudinal sections which may be bound together and can be inserted, one into the other. These sections hold the central, vertex section of the SMA element between them. The SMA element can thus, during assembly operation, first be guided by the end face of its one longitudinal section and be affixed to the base plate by means of its ends. The valve stem can then be brought to completion in that the other longitudinal section can now be force fit connected to the already preassembled longitudinal section, which includes the SMA element. A further problem in the assembly of the SMA element is that the element must be affixed to the base plate with a pretensioning which exactly matches the retraction force of the reset apparatus. Such an assembly is assured in the case of another well regarded embodiment in that the ends of the SMA element are respectively retained by crimping elements, which are fastened to the base plate. A simple assembly of the SMA element with an exact pretensioning is made possible by this embodiment, as will be explained in greater detail below.

As a possibility for an uncomplicated control of the valve stem, a limit switch is located on the base plate, which coacts with the valve stem. A valve of this type accordingly possesses an on/off function and can be installed for simply supported application cases. A control to include the intermediate positions, which requires a precise determination of the shortening of the wire or, which is the same thing, determining the position of the valve stem, can be carried out with potentiometer-centered control circuits or with echo detector aids. The provision of electric or electronic components suitable for such applications, as well as other functions, is already available with an advantageous assembly on the base plate itself, which constitutes, essentially, a circuit board already equipped with the desired components.

Giving consideration to the above mentioned effective use of force, it becomes advantageous if the legs of the SMA elements close an angle of 130° to 160°. Such a design provides an advantage in both a linear translation and a mechanical advantage. An arrangement is also possible in which the SMA element experiences a longitudinal lengthening of only 0.3% by which a theoretical extension of the longitude would run up to 6%. A modified extension of this kind has a positive effect on the achievable tallies of production. Just as much as the longitudinal changes increase, just so much less is the stability of an SMA element. The V-shaped arrangement of the legs of the SMA element provides a favorable diminution of force. In the case of, for example, a wire of NiTi, the maximum allowable tensioning of 70 N/mm$^2$ can, however, generate sufficient force components in the axial direction of the valve stem. An optimization of the effects can be achieved in that an angle between 135° and 155°, especially an angle of about 145° can be obtained.

BRIEF DESCRIPTION OF THE DRAWINGS

At this point, the invention will be more closely described, with references made to the attendant drawing. There is shown in.

DETAILED DESCRIPTION OF THE DRAWINGS

Figure 1:
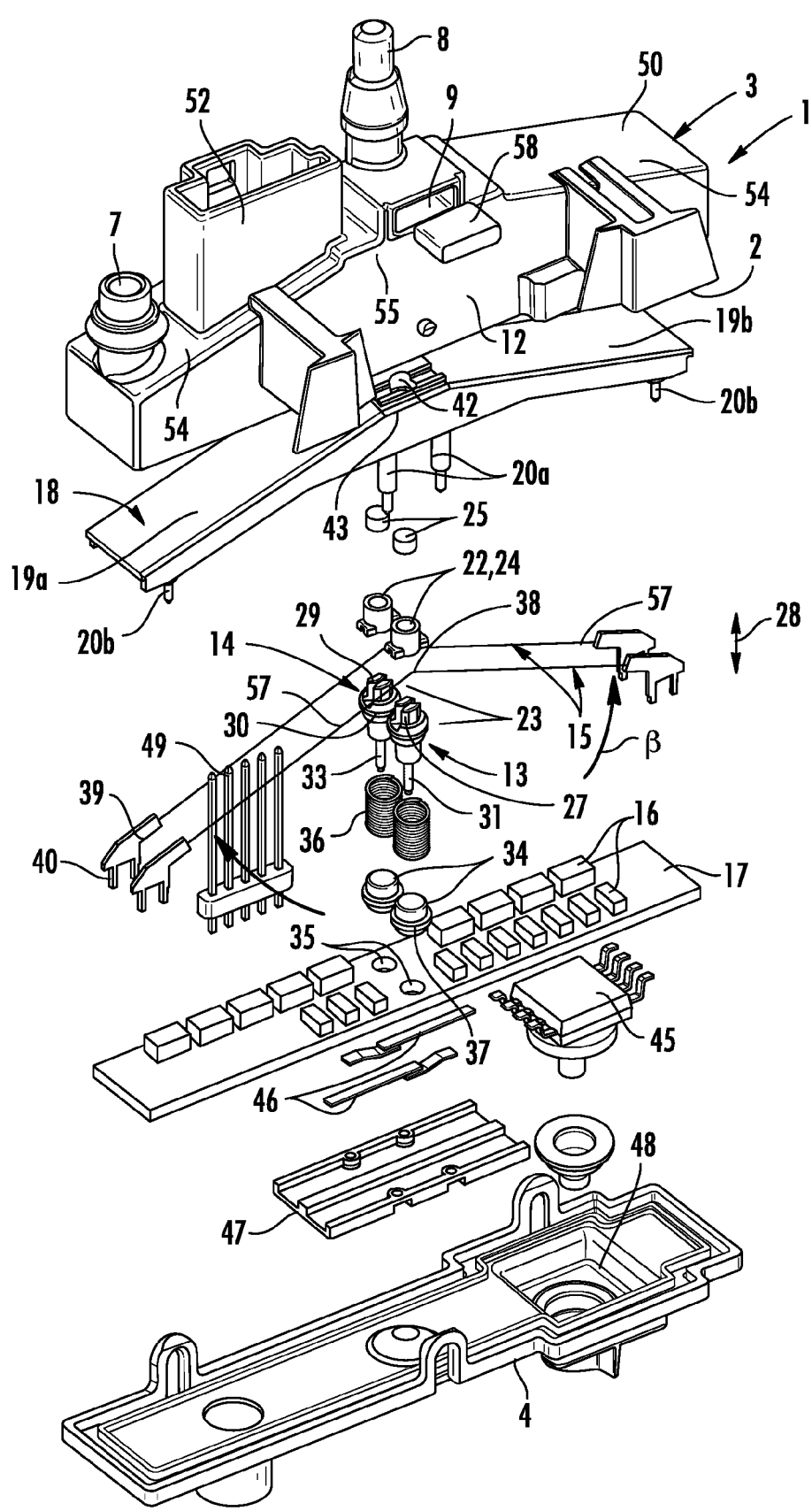
FIG. 1 A perspective explosion presentation of a 3/3-way valve in accordance with one aspect of the invention.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 2:
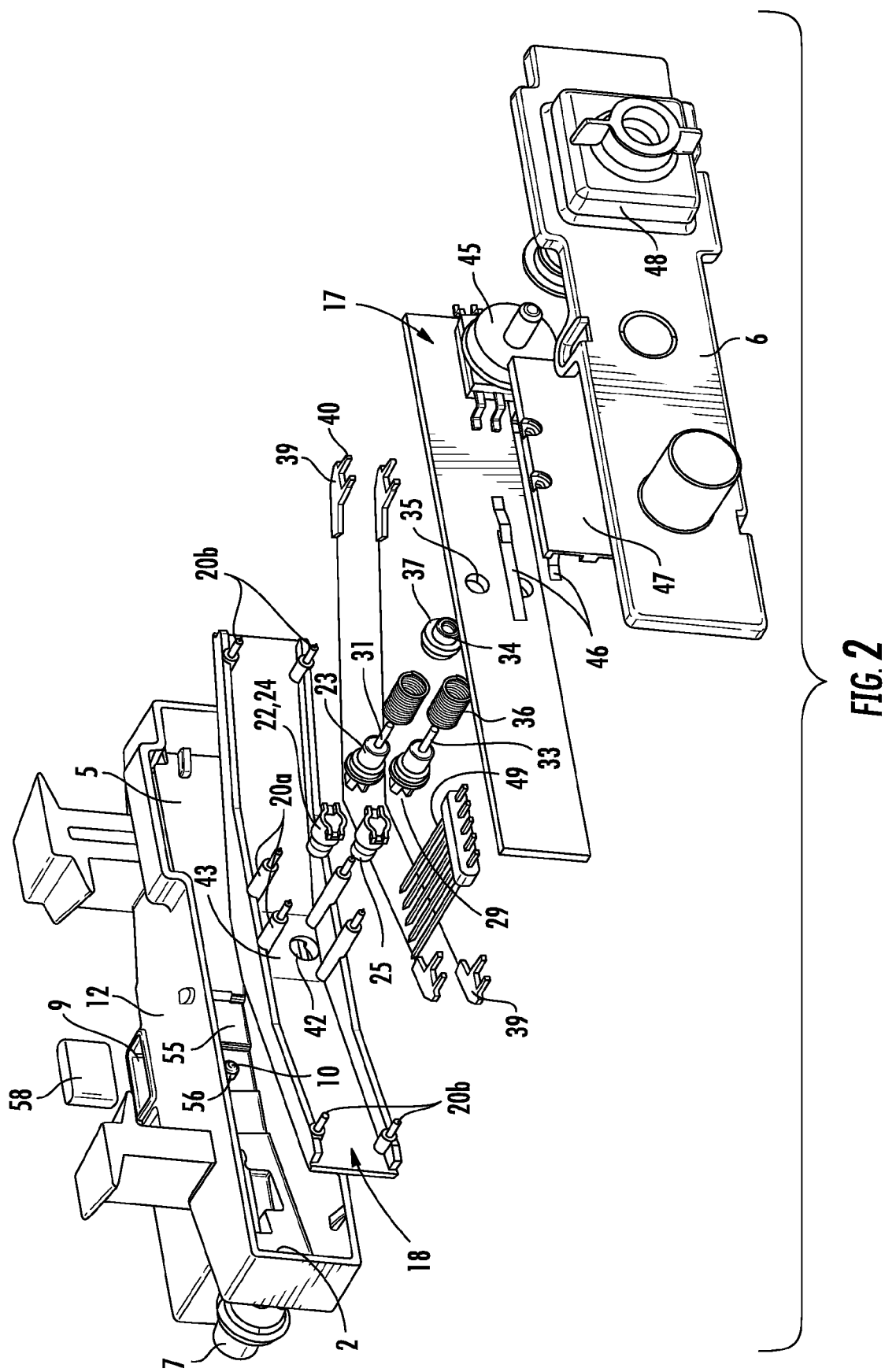
FIG. 2 A perspective explosion presentation of the valve of FIG. 1.
Figure 3:
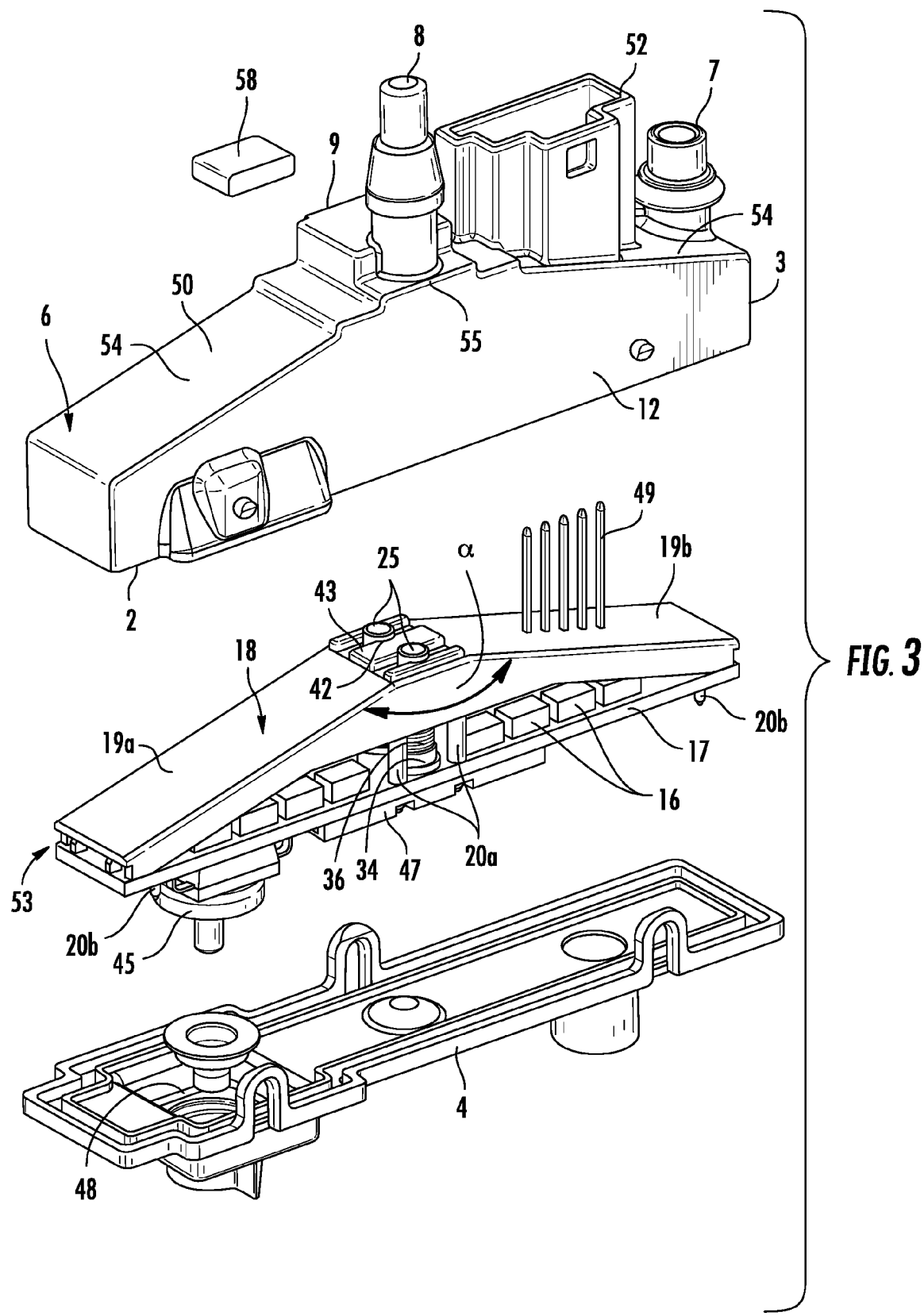
FIG. 3 The valve of FIG. 1 in a before mounting, in a perspective view.
Figure 4:
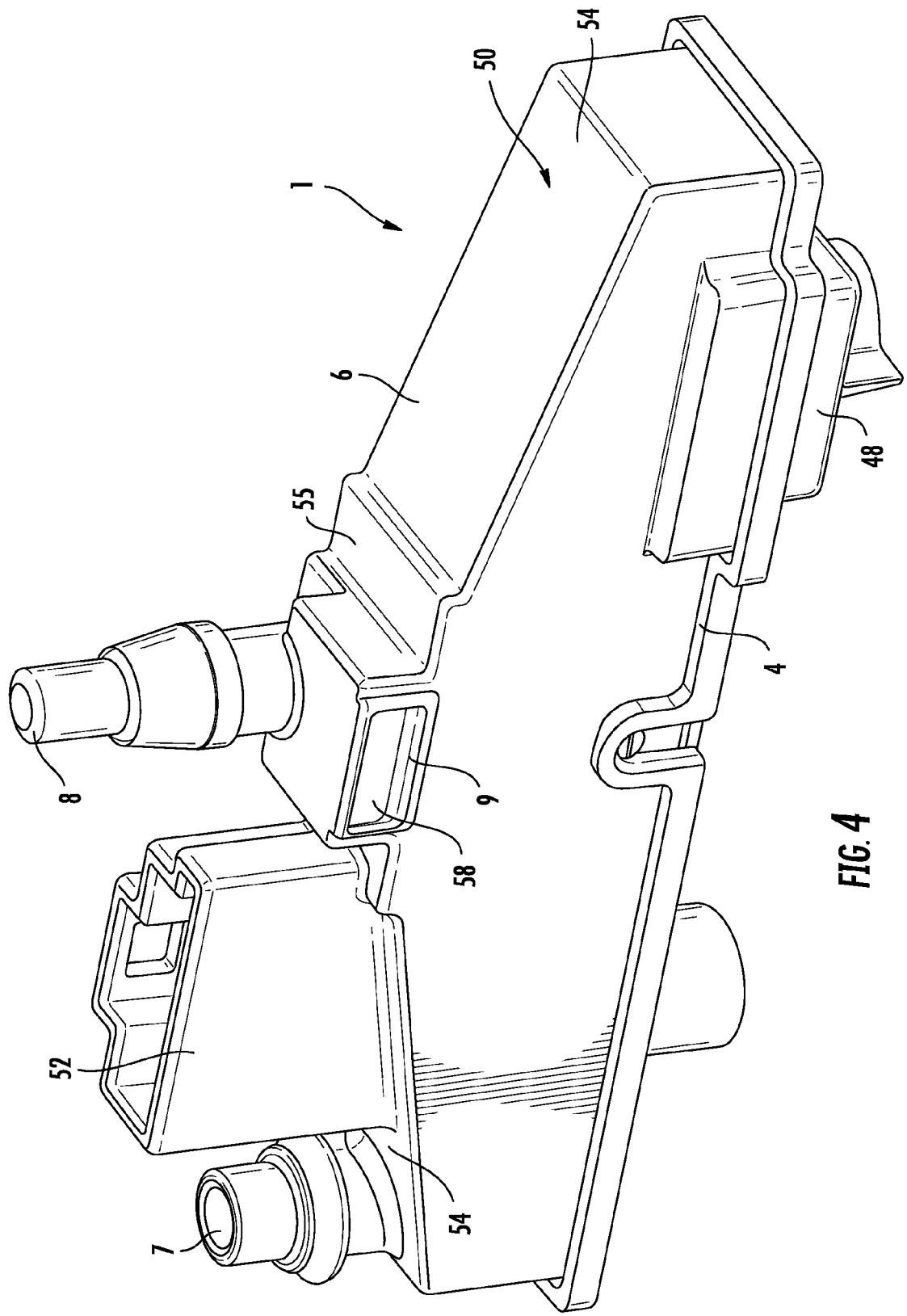
FIG. 4 The valve of FIG. 1 in a post mounted condition.

The valve, which is depicted in FIGS. 1 to 4 consists of a valve housing 1, the assembly of which valve includes a housing shell 3 which possesses an inlet port 2, in combination with a bottom piece 4 which closes off the inlet port 2. The connecting transition between the bottom piece 4 and the housing shell 3 is so designed that it is gastight. The valve housing 1, which is essentially in a rectangular boxlike shape, possesses on its side which is remote from the bottom, which remote side is to be hereinafter referred to as the upper side 6, a delivery port 7, which can be pneumatically connected with a source of air (not shown). Upper side 6 further possesses two controllable ports, namely one pressure port 8 and an atmospheric port 9. The ports 8 and 9 open with valve port 10 into the pressure chamber 5. In FIG. 2, only one of these valve ports 10 is made visible, namely that port which is interconnected with the pressure port 8. The other, and hidden, valve port 10 of the atmospheric port 9 is not shown, because of being covered by side wall 12 of the valve housing 1. In the pressure chamber 5 are two valve stems 13, 14, which respectively control the two valve ports 10. Also to be found are two SMA elements which govern the activation of the valve stems 13, 14. Further equipment in the pressure chamber 5 includes a base plate 17 serving as a circuit board for electric or electronic components 16 and also a shield wall 18. The base plate 17 and the shield wall 18, which are somewhat rectangular in plan, are so dimensioned that they can be inserted with precise clearances into the housing shell 2. The base plate 17 and the shield wall 18 are approximately of the same length. The shield wall 18 is constructed of two longitudinal sections 19a, 19b, which, in combination, close an obtuse angle α opening toward the base plate 17. The shield wall is affixed upon the base plate 17. For this fixation, alignment pins 20a, 20b extend themselves from that side of the shield wall 18 which is facing the base plate 17. These alignment pins 20 complementarily correspond to openings (not shown) in the base plate 17 into which they penetrate and are fixed in position. A total of four such alignment pins, designated as 20a are placed in the middle portion of the shield wall 18, while additionally, two pairs of pins, namely 20b, locate themselves at the opposite ends of shield wall 18.

The valve stems 13, 14 are assembled from two longitudinal sections 22, 23. The longitudinal sections 22 which form the first ends of the valve stems 13, 14, consist of hollow cylindrical encasements, whereby, therewithin, closure disks 25 can be inserted. An area 27 of the longitudinal section 23, which area faces the longitudinal sections 22, is so dimensioned, that the encasement shaped longitudinal sections 22 can be affixed thereon in a plug-in manner. In the area 27, the end face is crossed by a groove, which extends itself in the longitudinal, axial direction 28 of the valve stems 13, 14, as well as transversely in the direction of the base plate 17. Onto the area 27, a further extending area 30 extends itself in a radially widened circumference and thereon is yet another area of less radial measurement, this being narrow zone 32. From the exposed end face of this narrow zone 32, a guidance pin 33 projects. This guidance pin 33 penetrates, during the assembly, a complementary guide shell 34, which in turn is inset in an opening 35 in the base plate 17. The valve stems 13, 14 are encompassed by helical, compression springs 36, which, respectively, abut themselves first, on a radial projecting flange of the guide shell 34 and second on the radially extended area 30 of the of the valve stems 13, 14.

The valve stems 13, 14 are actuated by the already mentioned SMA elements 15. These are wires from a NiTi alloy and have a diameter of 0.1 mm and a cross-sectional area of 0.008 mm$^2$. Each of the SMA elements 15 lies with a midpoint section in the groove 29 of a valve stem 13, 14. On the ends of the SMA elements 15 are affixed crimping elements 39, which, for themselves, and along with alignment pins 40, are inserted in openings (not shown) of the base plate 17 and affixed in that location, especially soldered therein.

For assembly of the SMA elements 15 on the base plate 17, first, onto this base plate 17 the crimping elements are fastened. The SMA elements are, with their middle section 38 laid into the grooves 29 of the valve stems 13, 14. The SMA elements exhibit first, a still greater length than corresponds to the end condition. The end sections of the SMA elements 15 are now laid into the crimping element and the excess of the SMA, which protrudes out of the crimping element, is subjected to the force which acts in its longitudinal direction. As soon as the predetermined pretensioning of the SMA element 15 is reached, the crimping element is pressed together to the side and the wire therein is firmly clamped. After the trimming of the projecting wire ends, finally, the shield wall 18, as has been described above, is affixed to the base plate. The first ends 24 of the valve stems 13, 14, which carry the closure disks 25, penetrate the openings 42 in a middle section 43 of the shield wall 18.

A pressure sensor 45 is mechanically and electrically connected to the underside of the base plate 17. Furthermore, limit switches 46 are respectively placed on the underside of the base plate 17 proximal to the openings 35. These limit switches 46 are activated by the second ends of the valve stems 13, 14 which here projected themselves into pins 33. The limit switches 46 are protected by a cover plate 47, which has been placed on the underside on the base plate 17. The bottom piece 4 of the valve housing 1 possesses a bulge 48 which accommodates a pressure sensor 45. Thereabove, on the base plate 17, electrical contact pins 49 are affixed, which penetrate the shield wall 18 (see FIG. 3). These contact pins likewise penetrate the wall 50 which forms the upper side 6 of the housing shell 3, protruding therefrom into a plug housing 52. As can be easily inferred from FIG. 3, the shield wall 18 forms, in conjunction with the base plate 17 and the thereon affixed fittings, a practically complete, functional component, namely module 53, which can be installed in different arrangements and in different numbers within the valve housing. Starting considerations from the preassembly-state shown in FIG. 3, the module 53 is inserted into the housing shell 3 and this is subsequently closed by the bottom piece 4. The wall 50 of the housing shell 3 has two wall sections 54, which close between them an angle α. The two inclined wall areas 54 extend themselves into a midsection 55, which runs parallel to the base plate 17 and, during the course of assembly, lies adjacent to the middle section 43 of the shield wall 18. The closure disks 25, in this arrangement, are pressed by the helical, compression springs 36 against the valve openings 10. That is to say, they are pressed against the bordering valve seats 56 (see FIG. 2).

As may be clearly seen in FIGS. 1 and 2, those legs 57 of the SMA elements bend away from the valve stems 13, 14 to form an angle β of approximately 145° which, more or less, corresponds to the angle α of the shield wall 18. The angular, that is, the obtuse V-shape of the SMA elements 15, also allows action as a linear translator. Thus, for example, a change in length of an SMA element 15 of 0.1 mm consequently effects a movement of a valve stem 13 or 14 in the axial direction of about 0.4 mm. Giving consideration to the force exerted by the SMA elements when they contract, a mechanical advantage arises because of their said angular positioning. A force of 1 N acting in the longitudinal direction of the SMA elements 15, produces a force in the axial direction of 0.6 N.

In the case of the valves shown in FIGS. 1 to 4, the concern is with a 3/3 way valve. That is to say, the valve possesses three ports, in the present case, a pressure port 8, a general use port 7 and an atmospheric port 9. Should a consumption means be attached to the general use port 8, for instance, for filling an air pillow for a vehicle, then the SMA element governing the valve stem 14 is subjected to air flow, whereby said SMA element becomes shorter. The valve stem 14, accordingly, will then be separated from the valve opening which communicates with the general use port 8 and a pneumatic path is established between the source of compressed air and the said consumption means, i.e., the air pillow. If, subsequently, the pillow is to be relieved of air, then the SMA element is deactivated, that is, it finds itself deprived of a stream of air. When this situation obtains, the valve stem 14 is retracted into its starting position by the helical compression spring 36, and the closure disk 25 shuts off the pressure port 8. By the subjection of the SMA element assigned to the valve stem 13 to a flow of air, then the valve stem 13 is moved into its open position and an open pathway is established between the atmospheric port and the user port 7. In order that the noise development upon the deaeration is held to a minimum, a damping element 58 is inserted into the general user port 9. For the sake of a simplified case of application, the control of air flow over the SMA elements 15 can be carried out by means of the limit switches 46. The limit switches 46 are activated by the two end rods 31 of the valve stems 13, 14, when these are in their open position and thereby, the supply circuit for the SMA elements is interrupted. With the aid of the electronic component 16, however, a digital control of optional intervening points of the valve stems 13, 14 can be achieved, so that the valve, can be operated in the manner of flow control means. The actual system pressure, however, is in force within the entire pressure chamber 5. With the pressure sensor 45 which is on the pressure plate 17, this can be detected and by means of predetermined state of content, can be controlled in the concept of a memory function. By means of the relatively large angle β, which is closed by the legs 57 of the SMA elements 15, large bendings of the wire are avoided, which would lessen the operational life of the SMA elements. The NiTi wires are in accord with the predetermined time limits of the system by which the changeover times lie at about 100 ms (at room temperature), which is optimally appropriate for short linear extensions of 0 to 0.5 mm and in which forces cause motion in the range of 0 to 1.5 N. The heat capacity of the NiTi wire is very small, since the thickness is about 0.08 to 0.1 mm, so that a quick response of the entire system is assured. In order to have a control which is guaranteed to be independent of the outside temperature, corresponding electronic components are provided on the base plate 17, whereby the a temperature compensation of the hot flow for the SMA elements is maintained in the range of −40° C. to +80° C.

Figure 5:
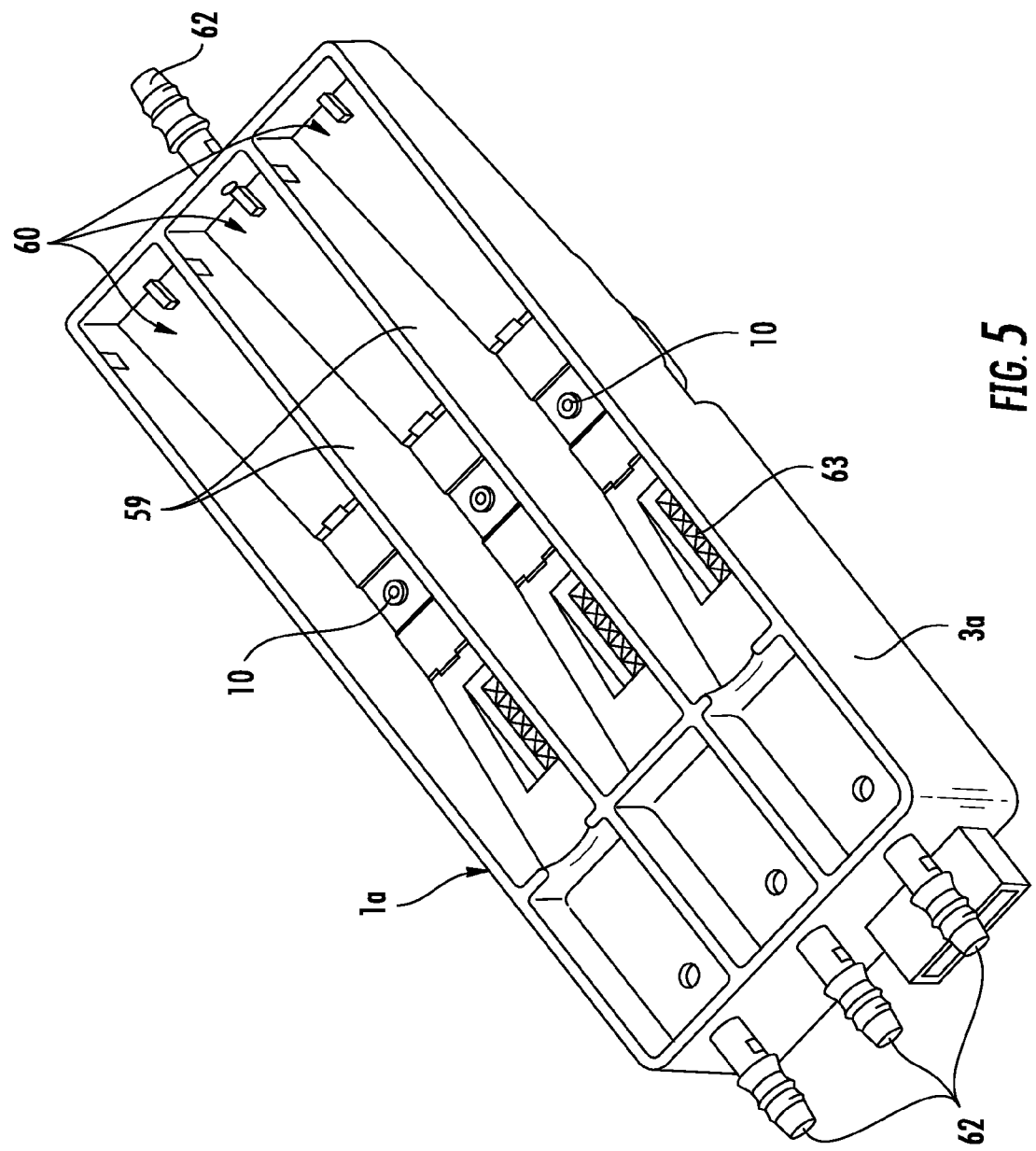
FIG. 5 A perspective presentation of a housing to accommodate several individual valves of a valve array.

In FIG. 5 is shown a valve housing 1a of a valve embodiment, or in more exact terms, is shown the housing shell 3a thereof. The pressure chamber encompassed by the housing shell 3a is subdivided into a plurality of partitioned spaces 60, each of which can retain a module 53. In the case of the housing shell 3a of the FIG. 5, penetrations are visible, which are also present in the housing shell 3 of the valve of FIG. 1 to FIG. 4. The penetrations 58 are passed through during assembly by the contact pins 49. On the valve housing 3a are available port fittings, which can receive a pressure corresponding to the respective function of a valve design for compressed air, or the fittings could be connected to the atmosphere or to general usage.

While preferred embodiments have been shown and described, those skilled in the art will recognize that changes and modifications may be made to the foregoing examples without departing from the scope and spirit of the invention. For example, specific styles and dimensions of various elements of the illustrated embodiments and materials used for those elements may be altered to suit particular applications and industry regulations. It is thus intended to claim all such changes and modifications as fall within the scope of the appended claims and their equivalents.

The invention claimed is:

1. A valve with a valve housing, which encompasses a pressure chamber and possesses at least two valve ports which open into the pressure chamber, whereby, in the pressure chamber at least one axially slidable valve stem exists, which controls at least one of the valve ports and which the at least one valve stem is movable between a closed position and an open position and the valve further encompasses at least one wire SMA element, the element having an SMA, as well as possessing a resetting element for the movement of the valve stems into the closure direction, comprising:

the valve stem carries on its first end a port sealing element, whereby its second end is axially guided within the pressure chamber on a base plate which the plate extends itself transversely to the valve stems, the SMA element is affixed by its ends onto the base plate and is further attached to the valve stems with a midsection, whereby the legs of the SMA element, which extends themselves sway from the valve stems, open at an angle (β) to the base plate, between the valve ports and the SMA element is to be found a shield wall, defining, at least one opening penetrated by the first end of the valve stems.

2. A valve in accord with claim 1, wherein the shield wall covers over essentially the entire cross-sectional area of the pressure chamber.

3. A valve in accord with claim 1, wherein the shield wall and the base plate are bound together in their middle areas.

4. A valve in accord with claim 1, wherein the shield wall in the area of the ends of the SMA elements is affixed to the base plate.

5. A valve in accord with claim 1, wherein the shield wall and a wall of the valve housing which carries valve ports constructed respectively from two wall sections, wherein the shield wall and the valve housing wall possess an angularity which corresponds to angularity of the legs of the SMA elements.

6. A valve in accord with claim 1, wherein the base plate has at least one opening, which is penetrated by the second end of a valve stem.

7. A valve in accord with claim 1, wherein the resetting element is a helical compression spring encompassing one of the valve stems.

8. A valve in accord with claim 1, at least one of the valve stems possesses two, separate, mutually connectable longitudinal sections, which are enclosing the midpoint sections of the SMA element.

9. A valve in accord with claim 8, wherein at least one of the longitudinal sections of the valve stems, which is subjected to load by the SMA element in the opening direction, possesses a groove in the end face for reception of the SMA element.

10. A valve in accord with claim 1, wherein the ends of the SMA element are respectively held by a crimping element, which is affixed to the base plate.

11. A valve in accord with claim 6, further comprising a limit switch disposed on the base plate, coacting with a valve stem.

12. A valve in accord with claim 11, wherein the limit switch is placed on that side of the base plate which is remote from the SMA element and wherein the limit switch is activated, the second end of the valve stem penetrating the opening of the base plate.

13. A valve in accord with claim 1, wherein the base plate is a circuit board equipped with components selected from the group consisting of electrical components, electronic components, and combinations thereof.

14. A valve in accord with claim 1, wherein the legs of the SMA element close an angle of 130° up to 160°.

15. A valve in accord with claim 14, wherein the said legs close an angle of 135° to 155°.

16. A valve in accord with claim 15, wherein the legs close an angle of 145°.

17. A valve in accord with claim 1, wherein the valve is a plurality of valves.

* * * * *

UNITED STATES PATENT AND TRADEMARK OFFICE
CERTIFICATE OF CORRECTION

PATENT NO. : 7,484,528 B2  Page 1 of 1
APPLICATION NO. : 11/313259
DATED : February 3, 2009
INVENTOR(S) : Beyerlein et al.

It is certified that error appears in the above-identified patent and that said Letters Patent is hereby corrected as shown below:

Col. 7, line 49 after the word "themselves", please delete the word "sway" and insert the word --away--.

Signed and Sealed this

Thirty-first Day of March, 2009

JOHN DOLL
*Acting Director of the United States Patent and Trademark Office*